(12) United States Patent
Steinhaus et al.

(10) Patent No.: US 8,475,545 B2
(45) Date of Patent: Jul. 2, 2013

(54) METHODS AND APPARATUS FOR USE IN COOLING AN INJECTOR TIP

(75) Inventors: Benjamin Campbell Steinhaus, Missouri City, TX (US); Shashishekara Sitharamarao Talya, Houston, TX (US); Daniel Aaron Kessler, Houston, TX (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 13/046,921

(22) Filed: Mar. 14, 2011

(65) Prior Publication Data

US 2012/0237411 A1 Sep. 20, 2012

(51) Int. Cl.
   *B05B 3/08* (2006.01)
(52) U.S. Cl.
   USPC .................................. 48/61; 422/198; 239/132
(58) Field of Classification Search
   None
   See application file for complete search history.

(56) References Cited

U.S. PATENT DOCUMENTS

| | | |
|---|---|---|
| 3,828,850 A | 8/1974 | McMinn et al. |
| 3,874,592 A | 4/1975 | Buschmann et al. |
| 4,752,303 A | 6/1988 | Materne et al. |
| 4,865,542 A | 9/1989 | Hasenack et al. |
| 6,892,654 B2 | 5/2005 | Whittaker et al. |
| 2003/0196576 A1* | 10/2003 | Whittaker et al. ............ 110/260 |
| 2009/0274594 A1 | 11/2009 | Guo et al. |

FOREIGN PATENT DOCUMENTS

| | | |
|---|---|---|
| WO | 0007713 A1 | 2/2000 |
| WO | 2009019271 A1 | 2/2009 |
| WO | 2009019272 A1 | 2/2009 |

\* cited by examiner

*Primary Examiner* — Imran Akram
(74) *Attorney, Agent, or Firm* — Armstrong Teasdale LLP (57) ABSTRACT

A method of assembling a feed injector is provided. The method includes providing a feed injector tip that includes an inlet, a tip end, a flow passage that extends longitudinally through the feed injector tip from the inlet to the tip end, an annular cooling channel that substantially circumscribes the flow passage, and a buffer region that separates the annular cooling channel from the flow passage. The method further includes coupling the feed injector tip to the feed injector to enable a fluid to be channeled through the flow passage, such that the fluid flows past the inlet, at which the buffer region has a first width, before flowing past the tip end, at which the buffer region has a second width, the first width wider than the second width, and coupling a cooling assembly to the feed injector to enable a flow of cooling fluid to be channeled into the annular cooling channel.

12 Claims, 7 Drawing Sheets

METHODS AND APPARATUS FOR USE IN COOLING AN INJECTOR TIP

BACKGROUND OF THE INVENTION

The present invention relates generally to gasification systems used in power generation plants, and more particularly, to injector tips used in integrated gasification combined cycle (IGCC) plants.

At least some known IGCC plants include a gasification system that is integrated with at least one power-producing turbine system. For example, at least some known gasification systems convert a mixture of fuel, air or oxygen, liquid water, and/or steam, and/or $CO_2$ into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for use in driving a steam turbine. Power generated by the steam turbine also drives an electrical generator that provides electrical power to the power grid.

At least some known gasification systems use at least one feed injector to supply fuel into a reactor vessel coupled within the gasification system. Known feed injectors are exposed to broad temperature extremes within the reactor vessel. Specifically, the tips of known feed injectors are exposed to high temperatures that may, over time, inhibit effective operation of the feed injectors and/or shorten the life span of the feed injectors. Additionally, at least some known feed injectors may be prone to ignite due to particle impingement. Over time, exposure to such elements may adversely affect the operation and/or shorten the life span of known feed injectors.

To prevent damage to the feed injectors, at least some known gasification systems cool the injectors using cooling water supplied from a closed-loop water system. However, such cooling systems provide only limited cooling and thus the injectors may still be thermally damaged and/or ignite due to particle impingement.

BRIEF DESCRIPTION OF THE INVENTION

In one aspect, a method of assembling a feed injector is provided. The method includes providing a feed injector tip that includes an inlet, a tip end, a flow passage that extends longitudinally through the feed injector tip from the inlet to the tip end, an annular cooling channel that substantially circumscribes the flow passage, and a buffer region that separates the annular cooling channel from the flow passage. The method further includes coupling the feed injector tip to the feed injector to enable a fluid to be channeled through the flow passage, such that the fluid flows past the inlet, at which the buffer region has a first width, before flowing past the tip end, at which the buffer region has a second width, the first width wider than the second width, and coupling a cooling assembly to the feed injector to enable a flow of cooling fluid to be channeled into the annular cooling channel.

In another aspect, a feed injector tip for use with a gasification system is provided. The feed injector tip includes an inlet, a tip end, a flow passage extending longitudinally through the feed injector tip from the inlet to the tip end, the flow passage defined by an outer wall and an inner wall, an annular cooling channel substantially circumscribing the flow passage and extending from the inlet to the tip end, and a buffer region separating the annular cooling channel from the flow passage, the buffer region having a first width at the inlet, the buffer region having a second width at the tip end, the first width is wider than the second width.

In yet another aspect, a gasification system is provided. The gasification system includes a reactor vessel and at least one feed injector extending generally longitudinally through the reactor vessel. The at least one feed injector includes an inlet, a tip end, a flow passage extending longitudinally through the feed injector from the inlet to the tip end, the flow passage defined by an outer wall and an inner wall, an annular cooling channel substantially circumscribing the flow passage and extending from the inlet to the tip end, and a buffer region separating the annular cooling channel from the flow passage, the buffer region having a first width at the inlet, the buffer region having a second width at the tip end, the first width is wider than the second width.

DETAILED DESCRIPTION OF THE INVENTION

The methods and apparatus described herein facilitate enhanced operation of a gasification system. Specifically, utilizing a cooling channel as described herein facilitates cooling a tip portion of a feed injector. Moreover, utilizing a cooling channel as described herein facilitates inhibiting auto-ignition of feed injector material from particle impingement. Cooling the tip portion and inhibiting ignition of the feed injector improves the durability and stability of the feed injector, and accordingly, reduces maintenance, repair, and replacement costs associated with IGCC plants using feed injectors. Furthermore, the method and apparatus for cooling a feed injector as described herein facilitates reducing capital costs associated with an IGCC plant.

Figure 1:
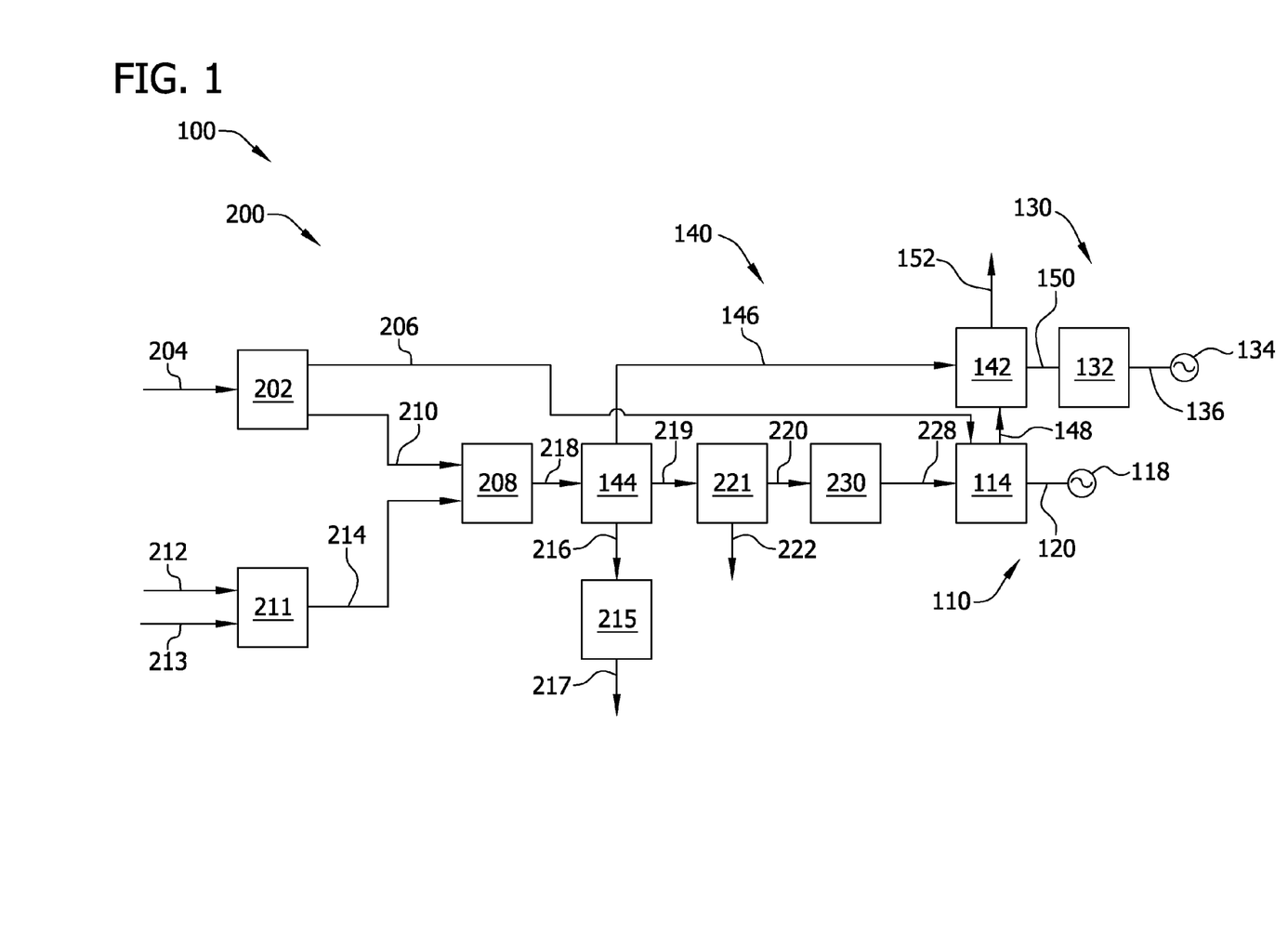
FIG. 1 is a schematic diagram of an exemplary integrated gasification combined-cycle (IGCC) power generation plant.

FIG. 1 is a schematic diagram of an exemplary gasification facility, and more specifically, an exemplary integrated gasification combined-cycle (IGCC) power generation plant 100. Alternatively, the methods and apparatus described herein may be used with any gasification facility in any other configuration and/or power generation plant. In the exemplary embodiment, IGCC plant includes a gas turbine engine 110 that includes a turbine 114. Turbine 114 is rotatably coupled to a first electrical generator 118 via a first rotor 120, and is also coupled in flow communication with at least one fuel source and at least one air source (neither shown in FIG. 1) to receive fuel and air from the fuel source and the air source, respectively. Turbine 114 mixes air and fuel, produces hot combustion gases (not shown), and converts heat energy within the combustion gases to rotational energy. The rotational energy is transmitted to generator 118 via rotor 120, wherein generator 118 converts rotational energy to electrical energy (not shown) for transmission to at least one load, including, but not limited to, an electrical power grid (not shown).

In the exemplary embodiment, IGCC plant 100 also includes a steam turbine engine 130. More specifically, engine 130 includes a steam turbine 132 that is rotatably coupled to a second electrical generator 134 via a second rotor 136.

IGCC plant 100, in the exemplary embodiment, also includes a steam generation system 140. More specifically, in the exemplary embodiment, system 140 includes at least one heat recovery steam generator (HRSG) 142 that receives exhaust gases (not shown) from turbine 114 via an exhaust gas conduit 148 that channels heat used within HRSG 142 to produce one or more streams of steam from at least one boiler feedwater source such as, but not limited to, at least one heated boiler feedwater stream (not shown). HRSG 142 also is coupled in flow communication with at least one heat transfer apparatus 144 via at least one steam conduit 146. Apparatus 144 is also coupled in flow communication with at least one heated boiler feedwater conduit (not shown), such that apparatus 144 receives heated boiler feedwater (not shown) from the same or a separate boiler feedwater source (not shown). HRSG 142 receives steam (not shown) from apparatus 144 via conduit 146, wherein HRSG 142 contributes additional heat energy to the steam. HRSG 142 is coupled in flow communication with turbine 132 via a steam conduit 150. In the exemplary embodiment, the cooled combustion gases are exhausted from HRSG 142 to the atmosphere via stack gas conduit 152. Alternatively, at least a portion of the excess combustion gases discharged from HRSG 142 is channeled for use elsewhere in IGCC plant 100.

Conduit 150 channels steam (not shown) from HRSG 142 to turbine 132. Turbine 132 receives steam from HRSG 142 and converts the thermal energy in the steam to rotational energy. The rotational energy is transmitted to generator 134 via rotor 136, wherein generator 134 converts the rotational energy to electrical energy (not shown) for transmission to at least one load, including, but not limited to, the electrical power grid. The steam is condensed and returned as boiler feedwater via a condensate conduit (not shown). Alternatively, at least a portion of the steam from HRSG 142, steam turbine 132 and/or heat transfer apparatus 144 may be channeled for use elsewhere in IGCC plant 100.

IGCC plant 100 also includes a gasification system 200. Moreover, in the exemplary embodiment, system 200 includes at least one air separation unit 202 that is coupled in flow communication with an air source via an air conduit 204. Such air sources may include, but are not limited to only including, dedicated air compressors (not shown) and/or a compressor (not shown) typically associated with gas turbine engine 110. Unit 202 separates air into one or more streams of oxygen ($O_2$), nitrogen ($N_2$) and other component streams (neither shown). Such other component streams may be released via a vent (not shown) or collected in a storage unit (not shown). In the exemplary embodiment, to facilitate combustion, at least a portion of $N_2$ is channeled to gas turbine 114 via a $N_2$ conduit 206.

System 200 includes a gasification reactor 208 that is coupled in flow communication with unit 202 and that receives $O_2$ channeled from unit 202 via an $O_2$ conduit 210. System 200 also includes a material grinding and slurrying unit 211. Unit 211 is coupled in flow communication with a carbonaceous material source and a water source (neither shown) via a carbonaceous material supply conduit 212 and a water supply conduit 213, respectively. In the exemplary embodiment, the carbonaceous material is petroleum or pet coke. Moreover, in the exemplary embodiment, unit 211 mixes the pet coke and water together to form a pet coke slurry stream (not shown) that is channeled to reactor 208 via a pet coke slurry conduit 214. Alternatively, any material that includes carbonaceous solids may be used that enables IGCC plant 100 to operate as described herein. Also, alternatively, non-slurry fuels that include solid, liquid and gaseous fuel substances may be used, including for example, mixtures of fuels and other materials, such as but not limited to, fuel and slag additives.

Reactor 208 receives the material slurry stream and an $O_2$ stream via conduits 214 and 210, respectively. Reactor 208 produces a hot, raw synthetic gas (syngas) stream (not shown), and a hot slag and char (both not shown) as a by-product of the syngas production.

Reactor 208 is coupled in flow communication with heat transfer apparatus 144 via a hot syngas conduit 218. Apparatus 144 receives the hot, raw syngas stream and transfers at least a portion of the heat to HRSG 142 via conduit 146. Subsequently, apparatus 144 produces a cooled, raw syngas stream (not shown) that is channeled to a scrubber and low temperature gas cooling (LTGC) unit 221 via a syngas conduit 219. Unit 221 removes a portion of slag and char entrained within the raw syngas stream (sometimes referred to as "fines") and facilitates the removal of the fines via a fines conduit 222. The fines are sent to a waste collection system (not shown) for either ultimate disposal and/or to be recirculated back into gasification reactor 208 to take advantage of unused carbon content within the fines. Unit 221 is also cools the raw syngas stream.

Apparatus 144 also removes slag and char from the hot, raw syngas stream. Specifically, in the exemplary embodiment, a slag and char handling unit 215 is coupled in flow communication with apparatus 144 via a hot slag conduit 216. Unit 215 quenches the balance of the char and slag, and simultaneously breaks the slag into smaller pieces wherein a slag and char removal stream (not shown) is produced and channeled through conduit 217. In a manner similar to the fines discussed above, the slag and char are channeled to a waste collection subsystem (not shown) for either ultimate disposal and/or to be recirculated into gasification reactor 208.

System 200 also includes an acid gas removal subsystem 230 that is coupled in flow communication with unit 221 for receiving the cooled raw syngas stream via a raw syngas conduit 220. Subsystem 230 also removes at least a portion of acid components (not shown) from the raw syngas stream, as described in detail below. Such acid gas components may include, but are not limited to, $H_2S$ and $CO_2$. Subsystem 230 separates at least some of the acid gas components into components that include, but are not limited to, $H_2S$ and $CO_2$. In the exemplary embodiment, $CO_2$ is not recycled and/or sequestered. Alternatively, subsystem 230 may be coupled in flow communication with reactor 208 via at least one $CO_2$ conduit (not shown) wherein a stream of $CO_2$ (not shown) is channeled to predetermined portions of reactor 208. The removal of $CO_2$ and $H_2S$, via subsystem 230, produces a clean syngas stream (not shown) that is channeled to gas turbine 114 via a clean syngas conduit 228.

During operation, air separation unit 202 receives air via conduit 204. The air is separated into $O_2$, $N_2$ and other components that are vented or collected. At least a portion of $N_2$ is channeled to turbine 114 via conduit 206, and at least a portion of $O_2$ is channeled to gasification reactor 208 via conduit 210. Any remaining portions of $N_2$ and $O_2$ may be channeled as a plurality of streams to other portions of IGCC 100 as needed, including, but not limited to, storage. Also, in operation, material grinding and slurrying unit 211 receives pet coke and water via conduits 212 and 213, respectively. A pet coke slurry stream is formed that is channeled to reactor 208 via conduit 214.

Reactor 208 receives $O_2$ via conduit 210, pet coke via conduit 214. Reactor 208 produces a hot raw syngas stream that is channeled to apparatus 144 via conduit 218. Some of the slag by-product that is formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 and the syngas is further cooled. Particulate matter, including some of the slag and char (in the form of fines), is removed from the syngas via conduit 222. The cool raw syngas stream is channeled to acid gas removal subsystem 230, wherein acid gas components are selectively removed and wherein a clean syngas stream is formed that is channeled to gas turbine 114 via conduit 228.

Further, in operation, turbine 114 receives $N_2$ and clean syngas via conduits 206 and 228, respectively. Turbine 114 compresses air from at least one air source (not shown) that turbine 114 subsequently mixes and combusts with syngas fuel to produce hot combustion gases. Turbine 114 channels the hot combustion gases to induce rotation of turbine 114 which subsequently rotates first generator 118 via rotor 120. At least a portion of the exhaust gases are channeled to HRSG 142 from turbine 114 via an exhaust gas conduit 148 to facilitate generating steam.

At least a portion of heat removed from the hot syngas via heat transfer apparatus 144 is channeled to HRSG 142 as steam via conduit 146. HRSG 142 receives the steam from apparatus 144, together with one or more streams of boiler feedwater and exhaust gases from turbine 114. Heat is transferred from the exhaust gases to the boiler feedwater to produce one or more streams of steam as well as increasing the heat energy contained in the steam from apparatus 144. In the exemplary embodiment, at least one of the streams of steam generated is heated to superheated conditions. Alternatively, two or more of the streams of steam may be mixed together to form at least one mixed stream that may be heated to superheated conditions. Alternatively, high temperature saturated steam may be formed. At least a portion of the superheated steam is channeled to steam turbine 132 via conduit 150 to induce rotation of turbine 132. Turbine 132 rotates second generator 134 via second rotor 136. Remaining steam may be channeled for use elsewhere within IGCC plant 100.

Figure 2:
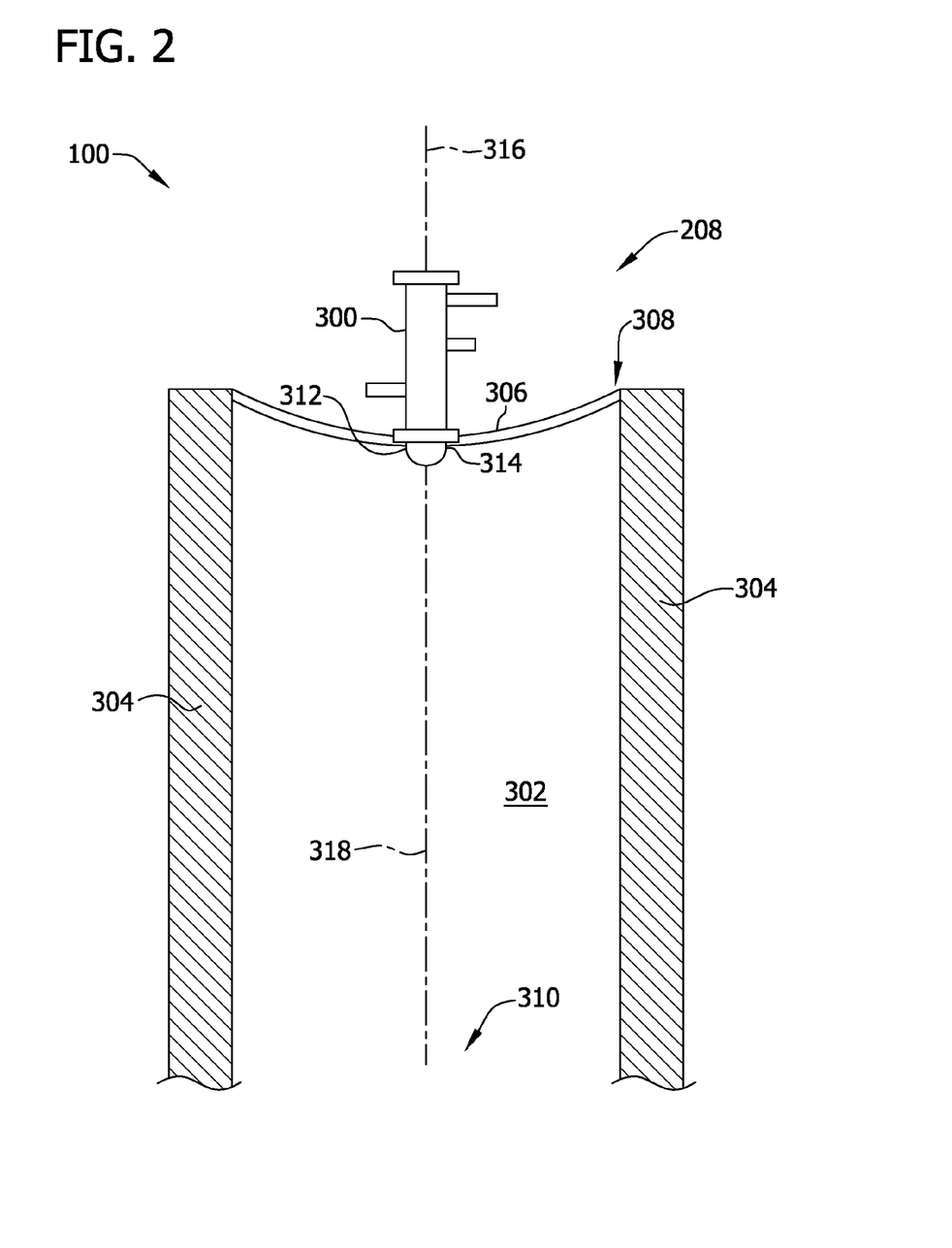
FIG. 2 is a schematic cross-sectional view of a gasification reactor that may be used with the IGCC power generation plant shown in FIG. 1.
Figure 3:
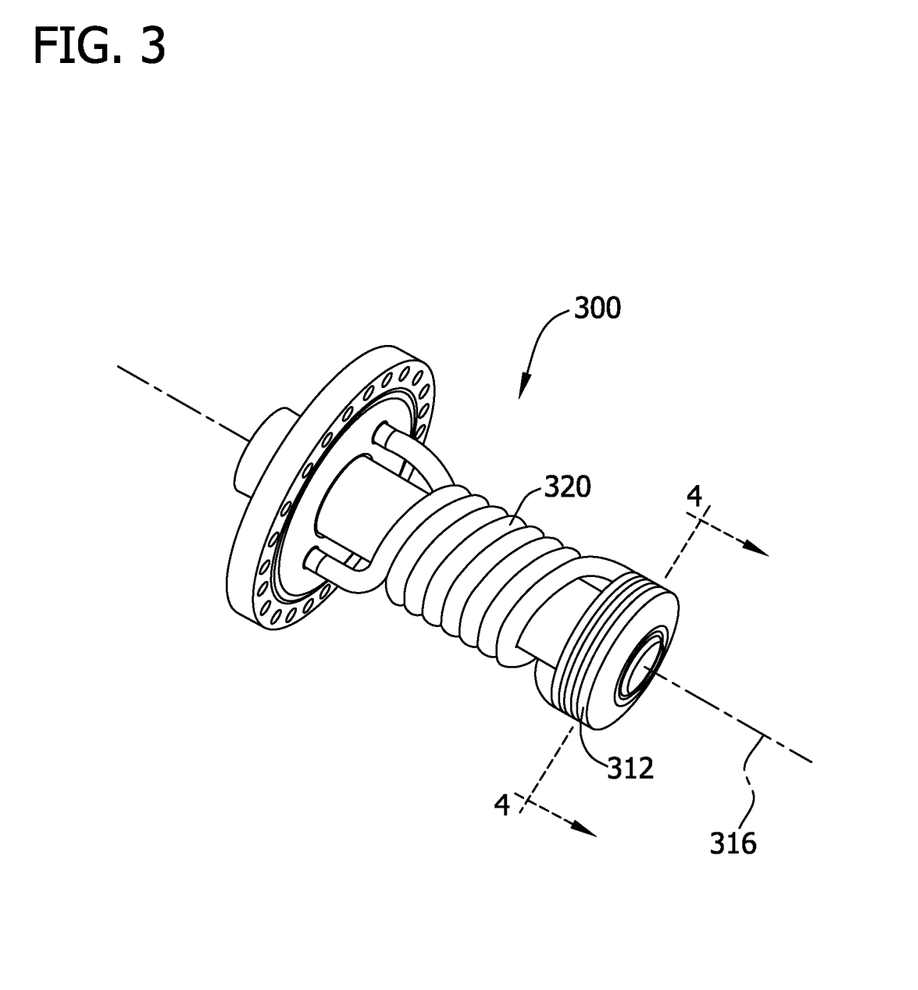
FIG. 3 is a schematic perspective view of a portion of an exemplary feed injector feed assembly that may be used with the gasification shown in FIG. 2.

FIG. 2 is a schematic cross-sectional view of gasification reactor 208. FIG. 3 is a schematic perspective view of a portion of an injector feed assembly 300 that may be used with the gasification reactor 208. In reactor 208, injector feed assembly 300 is coupled in flow communication with a gasification cavity 302.

Cavity 302 is at least partially defined by a substantially cylindrical reactor wall 304 and a by head end cover 306. Alternatively, reactor 208 may have any configuration that enables operation of reactor 208 as described herein. In the exemplary embodiment, injector feed assembly 300 is oriented substantially vertically, such that injector feed assembly 300 penetrates the top of reactor 208. Alternatively, injector feed assembly 300 may have any orientation including, but not limited to, substantially horizontal orientations.

In the exemplary embodiment, wall 304 is fabricated from at least one ceramic refractory material such as, but not limited to only being, heat tempered bricks. Alternatively, wall 304 is fluid-cooled, wherein the cooling fluids may include, but are not limited to only being, nitrogen, water, and/or steam. Cover 306 is sealingly coupled to at least a portion of a head end portion 308 of reactor 208. Cavity 302 is also partially defined by a tail end cover (not shown) that is sealingly coupled to at least a portion of wall 304. More specifically, the tail end cover is coupled at a tail end portion 310 of reactor 208 that is opposite portion 308. Alternatively, reactor 208 has any configuration that enables operation of IGCC 100 as described herein.

Injector feed assembly 300 includes a tip 312 that is inserted through an aperture 314 defined in head end cover 306 and that is sealingly coupled to head end cover 306 using a known fastening method. Reactor 208 is oriented such that an axial centerline 316 of injector feed assembly 300 is substantially collinear with a longitudinal centerline 318 of gasification cavity 302. Injector feed assembly 300 also includes a cooling assembly 320, as described in detail below.

Alternatively, reactor 208 may include a plurality of injection feed assemblies 300, wherein each assembly 300 has centerline 316 that is substantially co-linear with a predefined axial orientation that is similar to centerline 318. Each assembly 300 may have either a vertical orientation, a horizontal orientation, or any orientation that enables operation of reactor 208 as described herein. Furthermore, alternative embodiments of reactor 208 may include a plurality of assemblies 300 that are all oriented substantially similarly, or a plurality of assemblies 300 that include at least one assembly 300 that has a different orientation than all the remaining assemblies 300.

Figure 4:
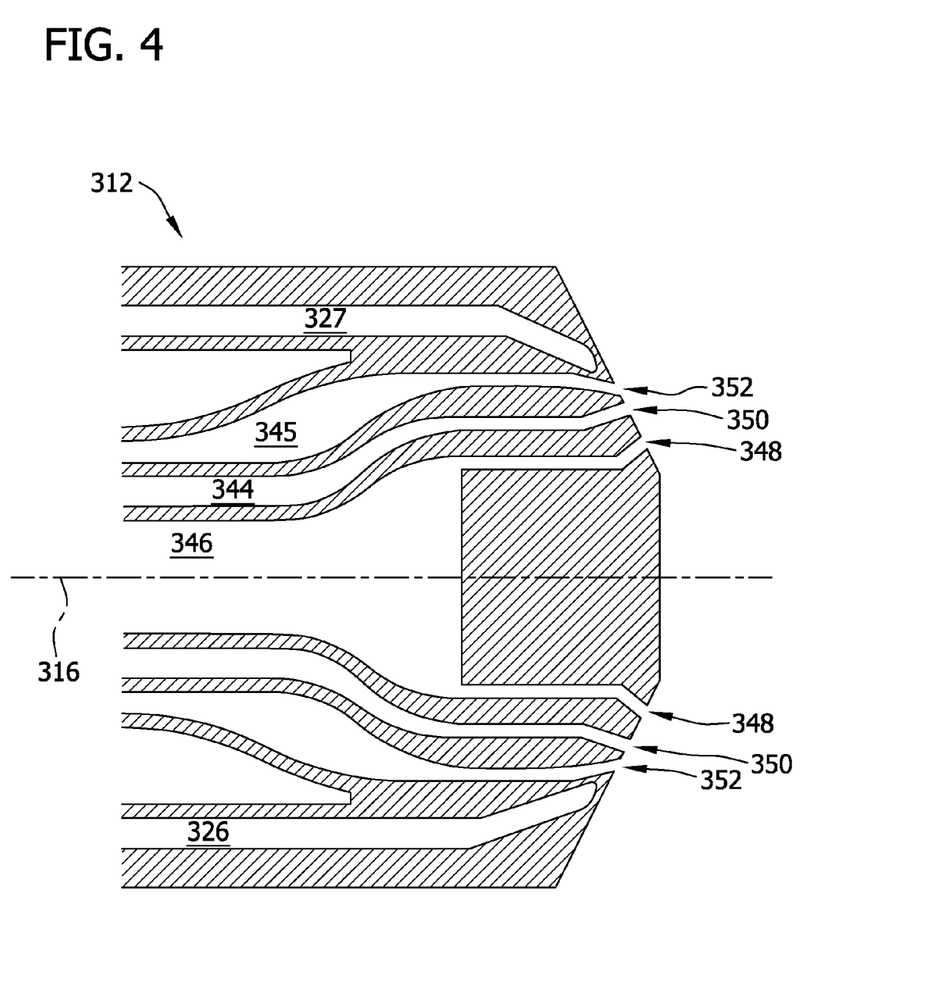
FIG. 4 is a schematic cross-sectional view of an injection device tip portion that may be used with the injector feed assembly shown in FIG. 3 and taken along area 4.
Figure 5:
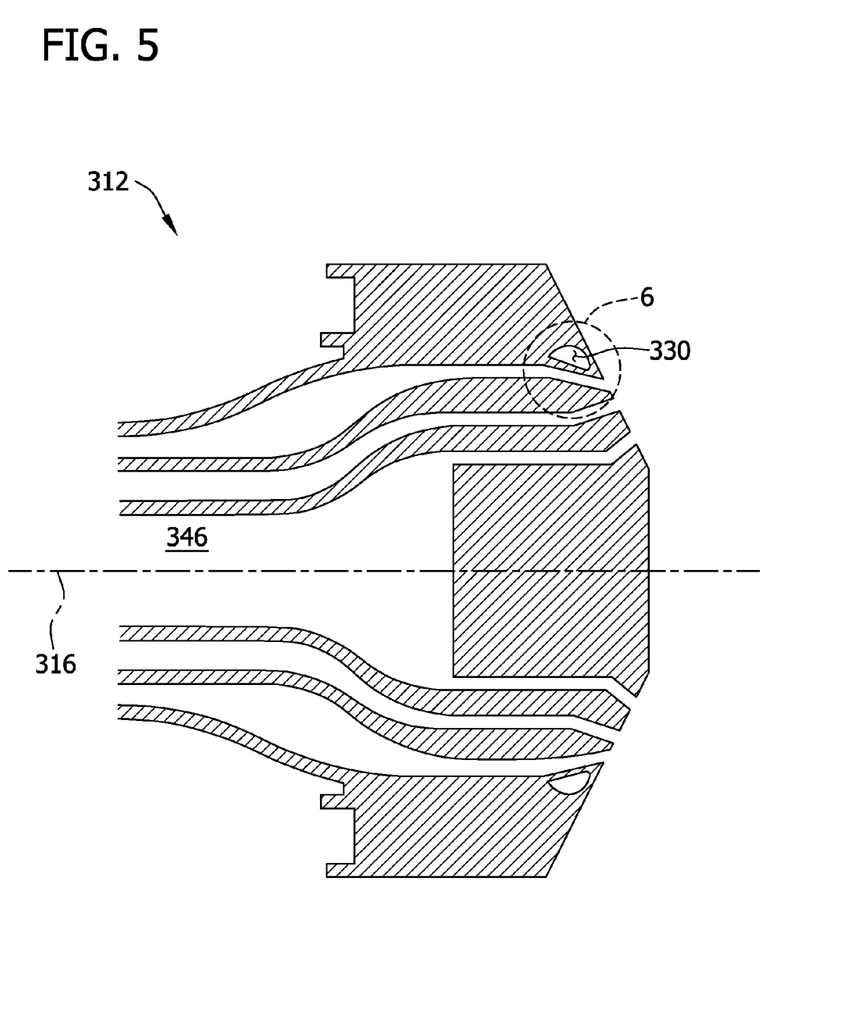
FIG. 5 is another schematic cross-sectional view of the injection device tip portion shown in FIG. 4.

FIG. 4 is a schematic cross-sectional view of tip 312 of injector feed assembly 300 taken along area 4 (shown in FIG. 3). FIG. 5 is another schematic cross-sectional view of tip 312 that is oriented 90° about centerline 316 from the perspective view illustrated in FIG. 3. Tip 312 controls the distribution of flow of reactant supply fluids between injector feed assembly 300 and gasification cavity 302.

In the exemplary embodiment, a cooling water inlet manifold 326 and a cooling water outlet manifold 327 of cooling assembly 320 are at least partially defined in tip 312. Cooling water inlet manifold 326 and cooling water outlet manifold 327 are each coupled in fluid communication to a cooling channel 330 that circumscribes tip 312. In one embodiment, cooling channel 330 is annular. Alternatively, cooling channel 330 may have any shape and/or orientation that enables cooling channel 330 to function as described herein.

A reactant or slurry channel 344 is defined within tip 312. An outer gaseous oxygen (GOX) channel 345 and an inner GOX channel 346 are also defined in tip 312. Inner GOX channel 346 and outer GOX channel 345 are each coupled in flow communication with an inner and an outer oxygen channel (neither shown) defined within assembly 300. Alternatively, either channel 345 and/or 346 may be oriented to channel any process fluid through tip 312 that enables operation of gasification reactor 208 including, but not limited to, steam, nitrogen, and/or carbon dioxide. In the exemplary embodiment, cooling channel 330 substantially circumscribes outer GOX channel 345.

In the exemplary embodiment, inner GOX channel 346 includes a nozzle 348. Slurry channel 344 also includes a nozzle 350, and outer GOX channel 345 also includes a nozzle 352. Nozzles 348, 350, and 352 facilitate mixing of the reactant streams within cavity 302. Moreover, nozzles 348, 350, and 352 also facilitate improving an efficiency of chemical reactions between the slurry and oxygen.

In the exemplary embodiment, tip 312 is fabricated as a single component from a plurality of individual components that are joined together via known coupling methods including, for example, brazing or welding. Alternatively, tip 312 may be formed by methods that include direct metal laser sintering. In another embodiment, tip 312 may be fabricated as a one-piece assembly.

Figure 6:
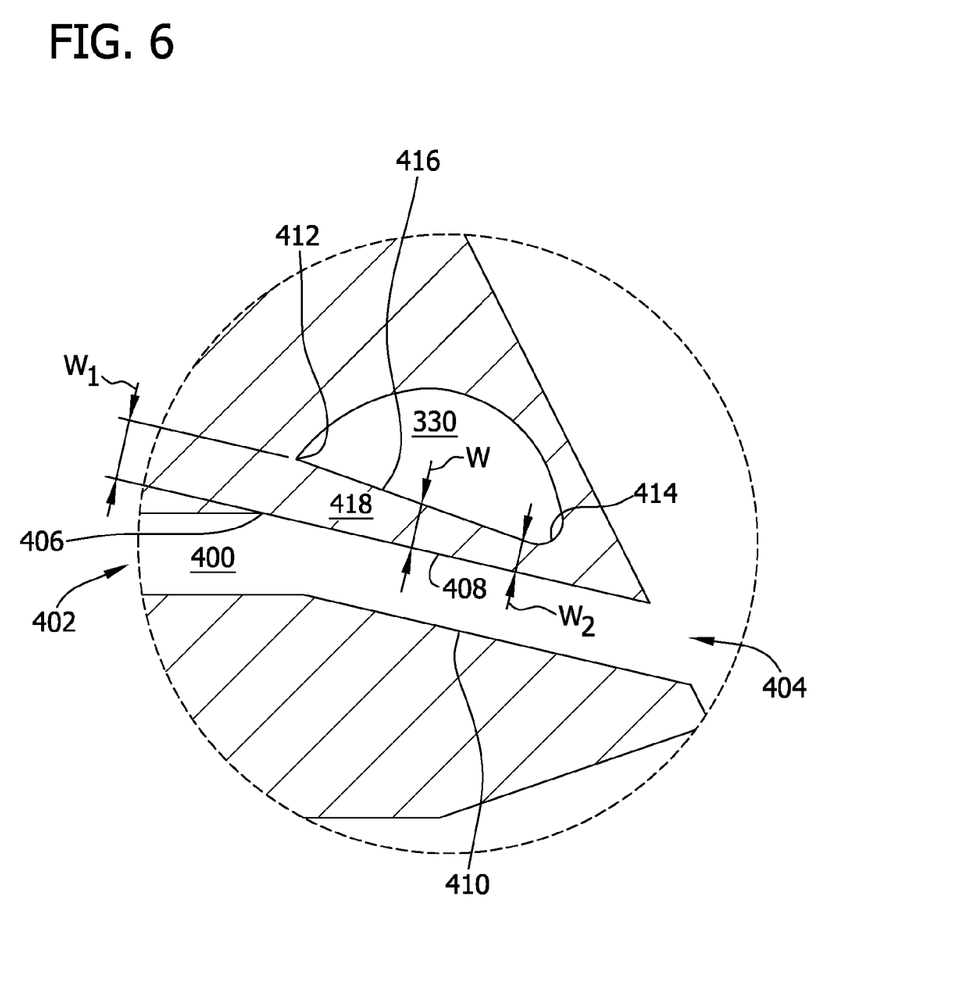
FIG. 6 is a schematic perspective cutaway view of the injection device tip portion shown in FIG. 4 and taken along area 6.

FIG. 6 is a schematic cross-sectional view of a portion of tip 312 taken along area 6 (shown in FIG. 5). As described above, cooling channel 330 substantially circumscribes outer GOX channel 345. Outer GOX channel 345 also includes a flow passage 400 that forms a portion of outer GOX channel 345. Reactants flow through flow passage 400 from an inlet 402 to a tip end 404. Between inlet 402 and tip end 404, flow passage 400 includes at least one flow change feature 406 that is defined adjacent to inlet 402. More specifically, flow passage 400 is further defined by an outer wall 408 and an inner wall 410, and flow change feature 406 is formed by outer wall 408 and inner wall 410 changing direction at flow change feature 406. In an exemplary embodiment, flow change feature 406 is formed by an angled change in outer wall 408 and inner wall 410. Alternatively, outer wall 408 and/or inner wall 410 could be shaped, i.e. arcuately, to create flow change feature 406 (not shown).

Cooling channel 330 includes a first side 412 and a second side 414. First side 412 is adjacent to inlet 402 and to flow change feature 406, and second side 414 is proximate to tip end 404 of flow passage 400. In another embodiment, first side 412 may be downstream from flow change feature 406. In a further embodiment, first side 412 may be upstream from flow change feature 406 or can be formed at the same position relative to centerline 316 as flow change feature 406 (not shown).

An inner cooling channel wall 416 extends between first and second sides 412 and 414, respectively. In an exemplary embodiment, inner cooling channel wall 416 is substantially planar. However, it should be noted that inner cooling channel wall 416 can have any suitable shape (e.g., arcuate, irregular, etc.) that enables tip 312 to function as described herein.

A buffer region 418 is between inner cooling channel wall 416 and flow passage 400 outer wall 408. Buffer region 418 is substantially solid and, in an exemplary embodiment, is fabricated from the same material as the rest of tip 312. Alternatively, tip 312 and buffer region 418 may be fabricated from a metal or from any other suitable material, such as a ceramic material, that enables assembly 300 to function as described herein.

A buffer region width W is defined between inner cooling channel wall 416 and outer wall 408 of flow passage 400. In an exemplary embodiment, a first width $W_1$ of buffer region 418 at first side 412 is wider than a second width $W_2$ of buffer region 418 at second side 414.

When inner cooling channel wall 416 is planar, width W of buffer region 418 tapers uniformly from first side 412 to second side 414. Alternatively, when inner cooling channel wall is non-planar and/or is oriented differently, (e.g., arcuate, irregular, etc.), buffer region 418 has a correspondingly different shape.

In operation, when a fluid, such as oxygen, flows through flow passage 400 from inlet 402 to tip end 404, the fluid changes flow direction at flow change feature 406. Flow change feature 406 also accelerates the fluid towards tip end 404. Because of the change in flow direction, particles entrained in the fluid impinge against outer wall 408 at or near flow change feature 406. Because the fluid is moving at a high velocity, the fluid particles impinge against outer wall 408 at a similarly high velocity. In fact, under some circumstances, the impinging particles could ignite the material forming buffer region 418. However, because buffer region 418 is defined at flow change feature 406, the additional width W of buffer region 418 facilitates reducing the likelihood that impinging particles will ignite the material forming buffer region 418, as described in more detail below.

Additionally, in the exemplary embodiment, the fluid particles accelerate when flowing from inlet 402 towards tip end 404. As such, in the exemplary embodiment, the fluid particles are moving at their fastest when exiting tip end 404 and entering gasification cavity 302. Because of the enhanced velocities of the particles, thermal strains within flow passage 400 are generally the highest adjacent to tip end 404. As such, to facilitate cooling tip 312, second side 414 of cooling channel 330 is located as close as possible to tip end 404.

As explained above, in the exemplary embodiment, first width $W_1$ is wider than second width $W_2$. As such, buffer region 418 is wider at flow change feature 406, in the area where fluid particles impinge against outer wall 408, and is narrowest adjacent to tip end 404 of flow passage 400, wherein thermal strains are generally the highest. Accordingly, the varying width W of buffer region 418 facilitates preventing auto-ignition due to impinging particles at or near flow change feature 406, and facilitates enhanced cooling of tip 312 at tip end 404 via cooling channel 330.

Figure 7:
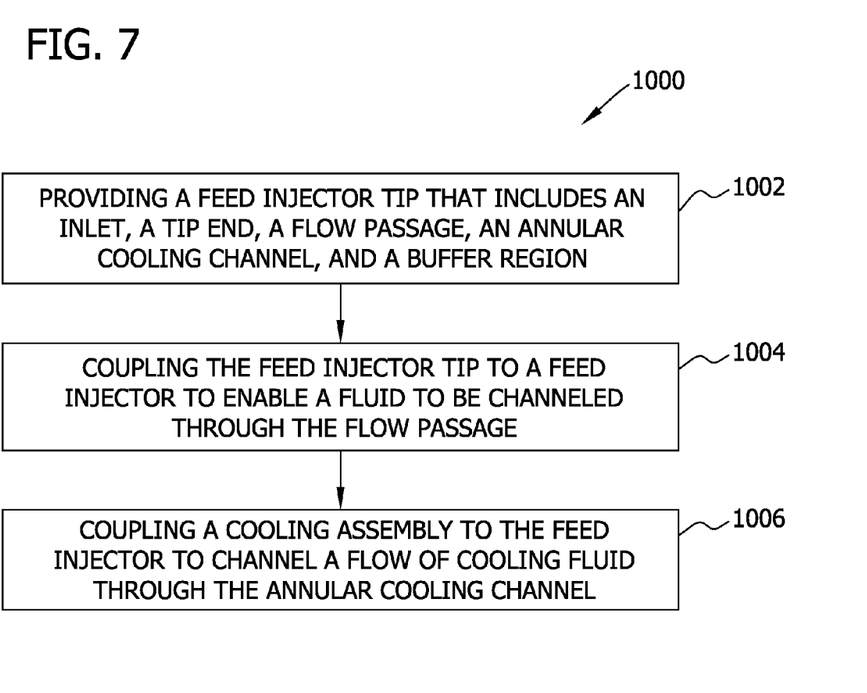
FIG. 7 is a flow chart of an exemplary method for assembling a feed injector.

FIG. 7 is a flow chart of an exemplary method 1000 of assembling a feed injector, such as feed injector 300 shown in FIG. 3. Initially, a feed injector tip 312 is provided 1002. Feed injector tip 312 includes an inlet 402, a tip end 404, and a flow passage 400 that extends longitudinally through feed injector tip 312 from inlet 402 to tip end 404. The feed injector tip 312 provided also includes an annular cooling channel 330 that substantially circumscribes flow passage 400 and a buffer region 418 that separates annular cooling channel 330 from flow passage 400. Method 1000 also includes coupling 1004 feed injector tip 312 to a feed injector 300 to enable a fluid to be channeled through flow passage 400, such that the fluid flows past inlet 402, at which buffer region 418 has a first width $W_1$, before flowing past tip end 404, at which buffer region 418 has a second width $W_2$, first width $W_1$ wider than the second width $W_2$. Furthermore, method 1000 includes coupling 1006 a cooling assembly to feed injector 300 to channel a flow of cooling fluid through annular cooling channel 330.

As compared to known feed injectors, the methods and apparatus described herein decrease the likelihood that feed injector material will auto-ignite, because of the shape and orientation of the cooling channel. Further, as compared to known feed injectors, the methods and apparatus described herein facilitate reducing maintenance, repair, and maintenance costs, because the cooling channels described herein improve the durability and stability of injector feed assemblies.

The methods and apparatus described herein facilitate enhanced operation of a gasification system. Specifically, utilizing a cooling channel as described herein facilitates cooling a tip portion of a feed injector. Moreover, utilizing a cooling channel as described herein facilitates inhibiting auto-ignition of feed injector material from particle impingement. Cooling the tip portion and inhibiting ignition of the feed injector improves the durability and stability of the feed injector, and accordingly, reduces maintenance, repair, and replacement costs associated with IGCC plants using feed injectors. Furthermore, the method and apparatus for cooling a feed injector as described herein facilitates reducing capital costs associated with an IGCC plant.

Exemplary embodiments of cooling feed injectors associated with IGCC plants are described above in detail. The methods, apparatus, and systems are not limited to the specific embodiments described herein or to the specific illustrated feed injectors and IGCC plants. While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A feed injector tip for use with a gasification system, said feed injector tip comprising:
   an inlet;
   a tip end;
   a flow passage extending longitudinally through said feed injector tip from said inlet to said tip end, said flow passage defined by an outer wall and an inner wall, wherein said flow passage includes a flow change feature, and said inlet is proximate said flow change feature;
   an annular cooling channel substantially circumscribing said flow passage and including a first end and an opposing second end, wherein said first end is adjacent said inlet and proximate said flow change feature, and said second end is proximate said tip end, wherein said cooling channel is defined by at least one cooling channel wall; and
   a buffer region extending radially directly from said cooling channel wall to said outer wall of said flow passage such that said buffer region separates said annular cooling channel from said flow passage, said buffer region is substantially solid and extends axially between first and second ends of said cooling channel, said buffer region having a first width at said first end, said buffer region having a second width at said tip end second end, said first width is wider than said second width.

2. A feed injector tip in accordance with claim 1, wherein said flow change feature is configured to accelerate a fluid through said flow passage.

3. A feed injector tip in accordance with claim 1, wherein said flow change feature is at least one of curved and angled.

4. A feed injector tip in accordance with claim 1, wherein said cooling channel wall extends from said inlet to said tip end.

5. A feed injector tip in accordance with claim 1, wherein said cooling channel wall is substantially planar from said inlet to said tip end, a width of said buffer region tapers uniformly from said inlet to said tip end.

6. A feed injector tip in accordance with claim 1, wherein said cooling channel wall is arcuate.

7. A feed injector tip in accordance with claim 1, wherein said buffer region is fabricated from one of a metal material and a ceramic material.

8. A gasification system comprising:
   a reactor vessel; and
   at least one feed injector extending generally longitudinally through said reactor vessel, said at least one feed injector comprises:
   an inlet;
   a tip end;
   a flow passage extending longitudinally through said feed injector from said inlet to said tip end, said flow passage defined by an outer wall and an inner wall, wherein said flow passage includes a flow change feature, and said inlet is proximate said flow change feature;
   an annular cooling channel substantially circumscribing said flow passage and including a first end and an opposing second end, wherein said first end is adjacent said inlet and proximate said flow change feature, and said second end is proximate said tip end, wherein said cooling channel is defined by at least one cooling channel wall; and
   a buffer region extending radially directly from said cooling channel wall to said outer wall of said flow passage such that said buffer region separates said annular cooling channel from said flow passage, said buffer region is substantially solid and extends axially between first and second ends of said cooling channel, said buffer region having a first width at said first end, said buffer region having a second width at said second end, said first width is wider than said second width.

9. A gasification system in accordance with claim 8, wherein said flow change feature is configured to accelerate a fluid through said flow passage.

10. A gasification system in accordance with claim 8, wherein said flow change feature is at least one of curved and angled.

11. A gasification system in accordance with claim 8, wherein said cooling channel wall extends from said inlet to said tip end.

12. A gasification system in accordance with claim 8, wherein said cooling channel wall is one of planar and arcuate from said inlet to said tip end.

* * * * *